United States Patent [19]
Nozuyama

[11] Patent Number: 5,862,359
[45] Date of Patent: Jan. 19, 1999

[54] DATA TRANSFER BUS INCLUDING DIVISIONAL BUSES CONNECTABLE BY BUS SWITCH CIRCUIT

[75] Inventor: Yasuyuki Nozuyama, Tokyo, Japan

[73] Assignee: Kabushiki Kaisha Toshiba, Kawasaki, Japan

[21] Appl. No.: 758,580

[22] Filed: Dec. 3, 1996

[30] Foreign Application Priority Data

Dec. 4, 1995 [JP] Japan .................................. 7-315571

[51] Int. Cl.$^6$ .................................................. G06F 13/00
[52] U.S. Cl. ................... 395/311; 395/280; 395/750.01; 395/311; 395/306; 395/307; 395/308
[58] Field of Search ................................... 395/280, 550, 395/800, 311, 307, 306, 308; 365/205; 364/200; 370/60

[56] References Cited

U.S. PATENT DOCUMENTS

| | | | |
|---|---|---|---|
| 4,155,117 | 5/1979 | Mitchell, Jr. et al. | 364/200 |
| 4,942,569 | 7/1990 | Maeno | 370/60 |
| 4,991,172 | 2/1991 | Cidon et al. | 370/94.1 |
| 5,159,689 | 10/1992 | Shiraishi | 395/800 |
| 5,418,933 | 5/1995 | Kimura et al. | 395/550 |
| 5,526,313 | 6/1996 | Etoh et al. | 365/205 |

FOREIGN PATENT DOCUMENTS

| | | |
|---|---|---|
| 0 473 280 A1 | 3/1992 | European Pat. Off. . |
| 0 494 056 A2 | 7/1992 | European Pat. Off. . |
| 0 600 661 A2 | 6/1994 | European Pat. Off. . |
| 0 646 873 A2 | 4/1995 | European Pat. Off. . |

OTHER PUBLICATIONS

Chiplets' Interconnections Pathway Control and Merging of Master and Slave Buses, IBM Technical Disclosure Bulletin, vol. 38, No. 06, Armonk, NY, Jun. 1995.

*Primary Examiner*—Thomas C. Lee
*Assistant Examiner*—Eric S. Thlang
*Attorney, Agent, or Firm*—Finnegan, Henderson, Farabow, Garrett & Dunner, L.L.P.

[57] ABSTRACT

In the low power consumption data transfer bus of the present invention, the mode of division of a bus is associated with a specific layout on an actual LSI chip or an actual LSI-mounted board, and access frequency between functional blocks connected to the bus and therefore the effect of the bus division can be obtained to the maximum degree for the object of achievement of the low power consumption. Further, the operation speed of the bus (that is, data transfer speed) can be improved as compared to the case where the bus is not divided. The data transfer bus includes a bus switch circuit connected so that one data transfer bus provided between a plurality of functional blocks within an LSI is divided into three or more divisional buses, and a decoder circuit for decoding an order signal which requires two of the plurality of divisional buses during an operation of the data transfer bus, and controlling the bus switch circuit so that only the two divisional buses are connected to each other in reply to a decode output.

10 Claims, 3 Drawing Sheets

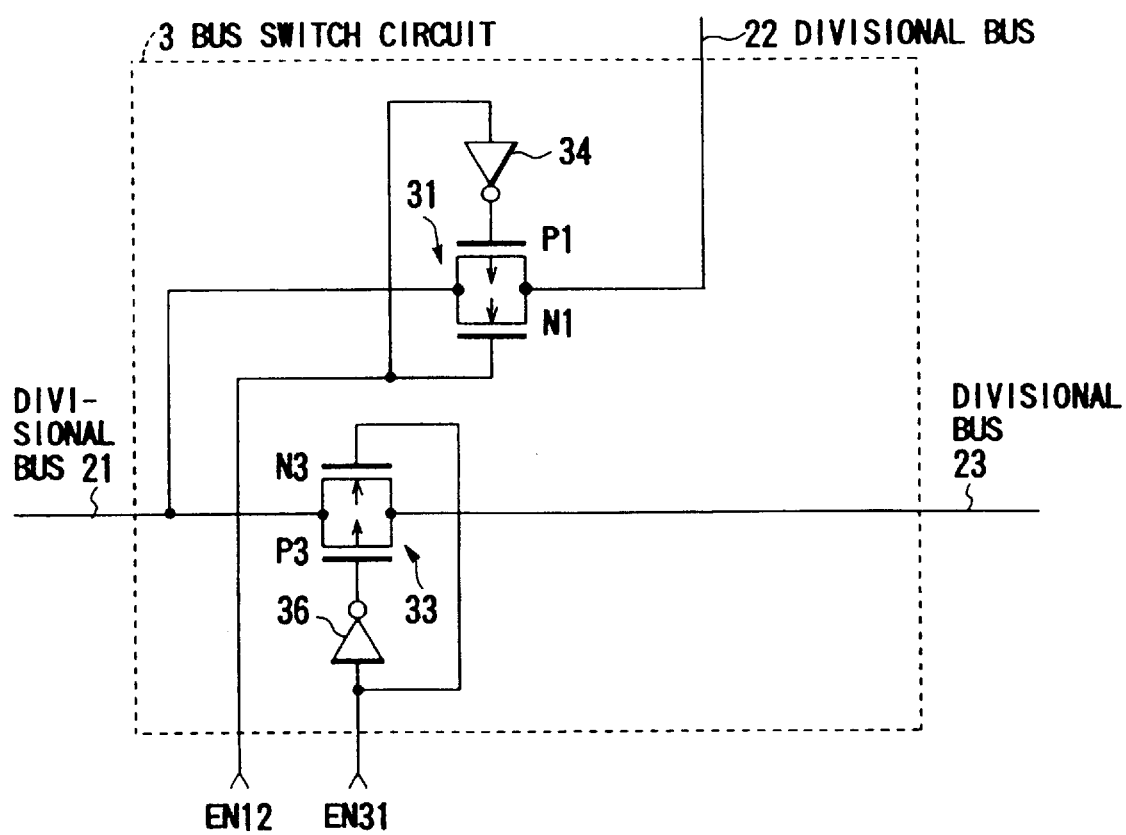
F I G. 2 B

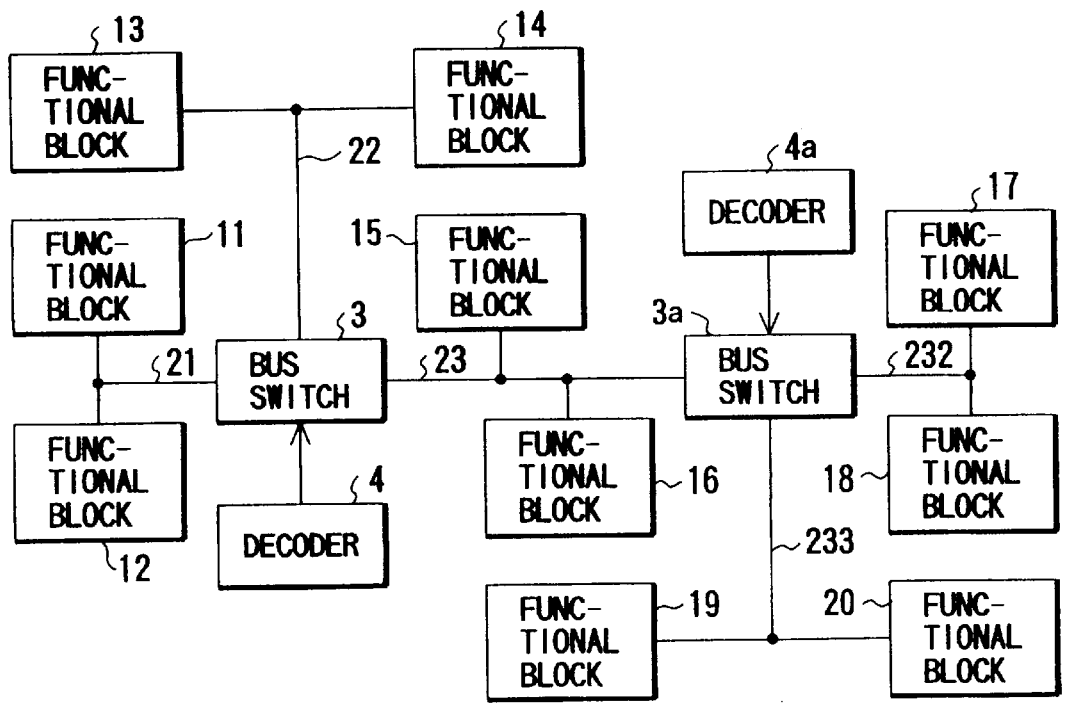
F I G. 3
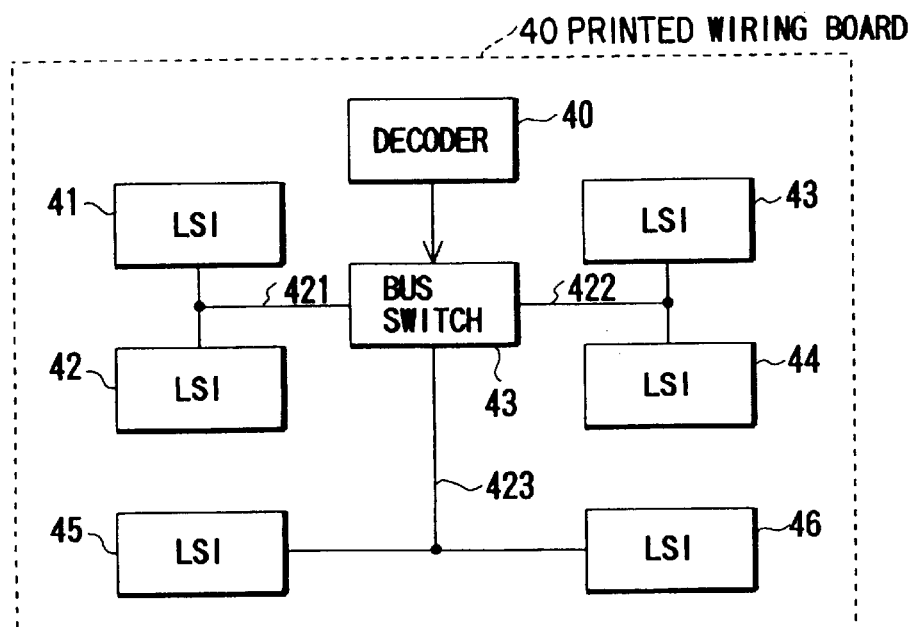
F I G. 4

DATA TRANSFER BUS INCLUDING DIVISIONAL BUSES CONNECTABLE BY BUS SWITCH CIRCUIT

BACKGROUND OF THE INVENTION

1. Field of the Invention

The present invention relates to a data transfer bus provided between a plurality of functional blocks inside an LSI such as a logic LSI (large-scale integrated circuit) or a VLSI (Very large-scale integrated circuit), or between a plurality of LSIs, and more specifically, to a low power consumption data transfer bus, to which a low power consumption technique was applied, for example, such a data transfer bus that is used in a micro-processor, a micro-controller or the like.

2. Description of the Related Art

Recently, the introduction of an LSI to a portable device is becoming very popular, and at the same time, there has been a problem of heat generation of an LSI, particularly, of a high performance type. Under these circumstances, there is an increasing demand for the development of an LSI or a VLSI of a low power consumption type.

An example of effective techniques of achieving a low power consumption is to decrease the power-supply voltage. In general, the power consumption of an LSI or the like is proportional to a square of the power-supply voltage. Therefore, for example, if the power-supply voltage is changed from 5V, which is most widely used at present time, to 3V, which is recently becoming popular, the power consumption decreases to 36% by itself.

However, if the competition between LSI vendors is taken into consideration, the lowering of the power-supply voltage is only the first step of the low power consumption. In order to meet the demand for the low power consumption, all of the levels of design, from the architecture, functions, circuit technique, to the processing technique, must be satisfied. At each level, effective measurements are, for example, to avoid operating a circuit when it is not necessary (to avoid wasting currents) and to avoid an excessive driving force (proportional to the size of a transistor) for the performance regarding the operation speed.

Generally, an LSI of a micro-processor, a micro-controller or the like, has a bus capable of transferring data between a plurality of functional blocks. The bus is connected to a number of functional blocks, and in many cases, drawn around in a wide area inside an LSI chip. Thus, the lowering of the power consumption of the bus greatly contributes to the achievement of the low power consumption of the LSI as a whole.

A conventional example of the low power consumption technique for a bus is a bus dividing method. In this method, one bus is divided into sections by a bus switch circuit, and the bus is operated only when it is needed. As a result, the average load capacitance driven can be decreased, and the power consumption can be lowered.

However, the mode of the above-described division of the bus is not considered in connection with a specific layout on an LSI chip, and therefore the achievement of the low power consumption is not completely realized. As the worst case, it is necessary to drive all the load on the bus. In this case, the load components situated on another side of the bus switch circuit as viewed from the buffer to drive the load, have to be driven via the bus switch circuit, and therefore the operation speed (data transfer speed) of the bus is decreased as compared to the case where the bus is not divided.

SUMMARY OF THE INVENTION

As described above, according to the conventional data transfer bus, the mode of the division of the bus is not considered in connection with a specific layout on an LSI chip, and therefore the achievement of the low power consumption is not completely realized, and the operation speed (data transfer speed) of the bus is decreased as compared to the case where the bus is not divided.

The present invention has been proposed as a solution to the above-described problems, and is achieved by associating the mode of the bus division with a specific layer on an actual LSI chip or an LSI-mounted board. The object of the present invention is to provide a low power consumption data transfer bus, in which the effect of the bus division can be induced to the maximum degree so as to achieve the low power consumption, and the operation speed (data transfer speed) of the bus can be improved as compared to the case where the bus is not divided.

A low power consumption data transfer bus according to the first aspect of the present invention, includes a bus switch circuit connected so that one data transfer bus provided between a plurality of functional blocks inside an LSI is divided into 3 or more divisional buses. The data transfer bus further comprises a decoder circuit which decodes a control signal which requires two of the three or more divisional buses during an operation, and controls the bus switch circuit so that only the two divisional buses are connected to each other in reply to a decode output.

A low power consumption data transfer bus according to the second aspect of the invention, includes a bus switch circuit connected so that one data transfer bus provided on a print wiring board on which a plurality of LSIs are mounted, and between the plurality of LSIs is divided into 3 or more divisional buses at one place. The data transfer bus further comprises a decoder circuit which decodes a control signal which requires two of the three or more divisional buses during an operation, and controls the bus switch circuit so that only the two divisional buses are connected to each other in reply to a decode output.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 2B is a circuit diagram which is the same as FIG. 2A when there is no access between the divisional bus 22 and 23.

FIG. 3 is a block diagram illustrating a low power consumption data transfer bus according to the second embodiment of the first aspect of the present invention; and FIG. 4 is a block diagram illustrating a low power consumption data transfer bus according to the second aspect of the present invention.

DETAILED DESCRIPTION OF THE PREFERRED EMBODIMENTS

Embodiments of the present invention will now be described in detail with reference to accompanying drawings.

Figure 1:
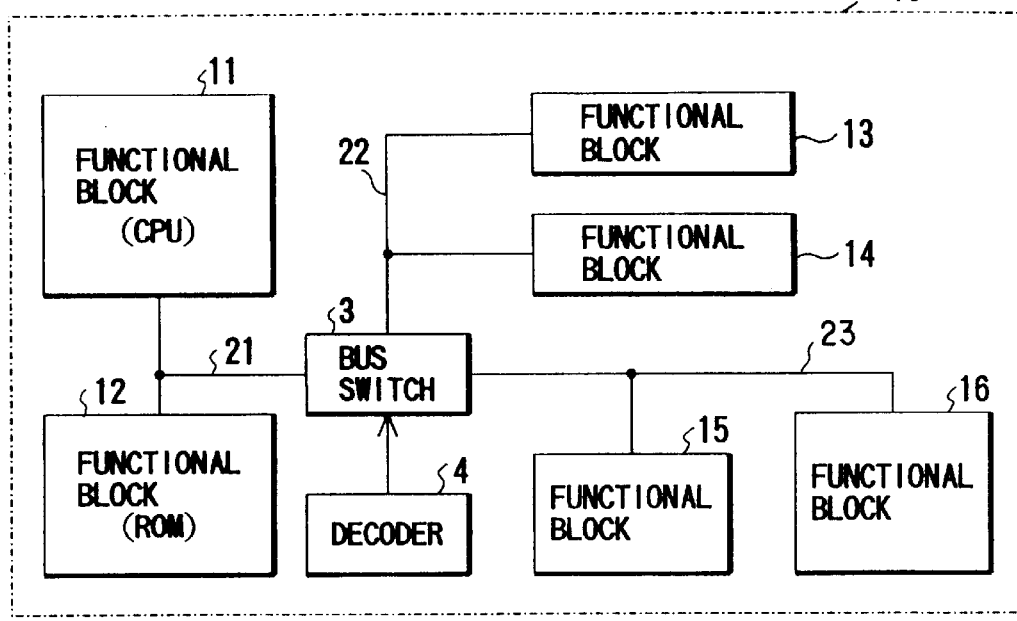
FIG. 1 is a block diagram illustrating a low power consumption data transfer bus according to the first embodiment of the first aspect of the present invention.

FIG. 1 is a circuit diagram showing a low power consumption data transfer bus of an LSI according to the first embodiment of the present invention.

As can be seen in FIG. 1, on an LSI 10 (for example, a micro-controller), a plurality of function blocks 11 to 16 such as a CPU, ROM, RAM and I/O interface, are provided.

Further, a bus switch circuit 3 is provided, which is connected such that one data transfer bus provided between the plurality of function blocks 11 to 16 within the LSI is divided into 3 or more divisional buses 21 to 23 (in this embodiment, 3).

Further, a decoder circuit 4 is provided, which serves to a control signal (supplied from the CPU, for example) which requires 2 of the divisional buses 21 to 23 in the operation of the data transfer bus, and control the bus switch circuit such that only the two of the divisional buses are connected to each other at one place on the basis of a decoded output.

It should be noted that in this embodiment, the number of the bus switch circuit 3 and the decoder circuit 4 is 1, respectively, and the bus switch circuit 3 is located at a predetermined region on the LSI chip 10.

Loads on the divisional buses 21 to 23 are arranged asymmetrically. Of the plurality of functional blocks 11 to 16, a pair of functional blocks which have the highest average access frequency with respect to the data transfer bus, (for example, CPU and ROM) are connected to one of the divisional buses 21 to 23, which has the smallest load (21 in this embodiment).

In other words, in FIG. 1, the divisional bus 21, to which a pair of functional blocks which have the highest average access frequency are connected, is constituted so that the load thereon is the smallest under the restriction of the floor layout of the plurality of functional blocks 11 to 16 on the LSI chip 10.

It should be noted that a load on a divisional bus includes a load component due to wiring, a load component of an output buffer of the functional block for outputting data to the divisional bus, and a load component of an input buffer of the functional block for receiving date from the divisional bus.

The access frequency to a functional block connected to a divisional bus is defined in the unit of a pair of a functional block for outputting data to the divisional bus and a functional block for receiving data from the divisional bus, and the data of the access frequency can be obtained by operating the LSI in simulation.

In the structure shown in FIG. 1, the entire power consumption P is proportional to:

$$S = \Sigma F_i \cdot L_i$$

where $F_i$ represents the access frequency of the i-th number of the divisional bus, and $L_i$ represents the load thereon. With this relationship, the minimization of the above $\Sigma F_i \cdot L_i$ will now be considered.

Supposing that $1 = \Sigma F_i$ and the access frequency of a divisional bus of a smaller number is higher than the access frequency of a divisional bus of a larger number, the following relationship is established:

$$F_i > F_{i+1}$$

Next, a procedure of carrying out the division of a bus which is close to the optimal for achieving the low power consumption, will now be described.

First, a pair of functional blocks (the first pair of functional blocks) having the maximum access frequency (the first access frequency) $f_i(=F_i)$ are connected to a first divisional bus 21. Then, in consideration of the layout of the first functional blocks on the LSI chip 10, a layout is made so that the load on the first divisional bus 21 becomes minimum.

Next, whether a pair of functional blocks (the second pair of functional blocks) having the second maximum access frequency (the second access frequency) $f_2$ to the maximum access frequency should be connected to the first divisional bus 21, or to a second divisional bus 22, is considered. It should be noted that, if the above two types (the first pair and the second pair) of functional blocks are substantially independent from each other, it is clear by intuitively that the the second pair of functional blocks should be connected to the second divisional bus.

The case where one of the second pair of functional blocks (for example, CPU) is the same as either one of the first pair of functional blocks, will now be considered. In the relationships provided below, $F_1$ represents the access frequency to the first divisional bus 21 in the case where the presence of the second pair of functional blocks is not considered (but an area in which it is laid out is maintained), $L_1$ represents the load thereon, $F_2$ represents the access frequency to the second divisional bus 22, $L_2$ represents the load thereon, f represents the access frequency to another block of the second pair of functional blocks, and $l_1$ and $l_2$ represents the load appended to the first divisional bus 21 and the second divisional bus, respectively, when another block is connected to the respective bus.

The amount which is proportional to the power consumption which increases in the case where the second pair of functional blocks are connected to the first divisional bus 21 is given by:

$$S_1 = (F_1 + f) \cdot (L_1 + l_1) + F_2 \cdot (L_1 + L_2)$$

In contrast, the amount which is proportional to the power consumption which increases in the case where the second pair of functional blocks are connected to the second divisional bus 22 is given by:

$$S_2 = F_1 \cdot L_1 + (F_2 + f) \cdot (L_1 + L_2 + l_2)$$

Therefore, the condition for that the power consumption becomes lower if the second pair of functional blocks are connected to the second divisional bus 22, is given by:

$$S_2 - S_1 < 0$$

That is, $(F_2+f) \cdot l_2 + f \cdot L_2 - (F_1+f) \cdot l_1 < 0$  $f \cdot (L_2 + l_2 l_1) < F_1 \cdot l_1 - F_2 \cdot l_2$ It is clear that if the above condition is satisfied, the case where the second pair of functional blocks are connected to the second divisional bus 22 is more effective in terms of the power consumption.

As the procedure similar to the above is repeated, a bus having a closely minimum power consumption as a whole can be constituted.

It should be noted that the procedure is one of several methods for constituting a bus having a closely minimum power consumption as a whole.

Regarding actual micro-computers or the like, in many cases, there is a clear contrast between a functional block pair having a high access frequency and a functional block pair not having such a frequency. Therefore, if the designer of an LSI designs it by trial and error following the above-described procedure, while considering the layout on the LSI chip 10, it is expected that the designer can achieve a closely minimum power consumption without much difficulty.

However, in the case where there is not a significant difference between functional block pairs in the access frequency, it is expected that the minimum solution for the power consumption cannot be easily found out manually. In order to obtain the minimum solution in a restrict sense, it is necessary to use a mathematical technique for obtaining the minimum solution. In this case, there are an excessive number of parameters to be optimized, and therefore in some cases, the solution becomes a quasi-minimum. In order to avoid this, it is preferable that a method by which a solution close to the minimum can be easily found, such as the simulated annealing method, should be utilized.

Further, if there is a restriction regarding the operation speed of a bus, such a restriction must also be taken into consideration. However, the bus switch circuit 3 is positioned in one place in order to satisfy the condition by which only the target two types of divisional busses are operated at the same time as described before, and therefore the restriction can be expressed in a simple form. That is, for all of $L_i$ and $L_j$ (i and j are different from each other), the designing should be conducted so that the relationship: $L_i+L_j<$the upper limit of the load which satisfies the operation speed of the bus, is satisfied.

Thus, the low power consumption data transfer bus of an LSI, according to the first embodiment, the mode of the bus division is associated with a specific layout on an actual LSI chip 10. With this structure, the effect of the bus division can be obtained to the maximum degree for the achievement of the low power consumption, and the operation speed (data transfer speed) of the bus can be improved to a certain degree as compared to the case where the bus is not divided.

It is also a possibility that the present invention is used so as to control the power consumption substantially to a possible lower limit, while maintaining the operation speed (data transfer speed) of the bus substantially to a possible upper limit by the divisional bus mode of the present invention. In order to achieve this, pairs of functional blocks which require high bus operating speeds are registered in advance. Then, while executing the above-described flow for achieving the low power consumption, the maximum bus load which satisfy the operation speed is obtained for each of the case where data signal crosses the bus switch circuit, and the case where it does not. Then, each time an appropriate functional block under the condition of the operation speed appears, this functional block should be connected to a predetermined divisional bus with a priority to functional blocks determined in terms of the demand for the achievement of the low power consumption. At any rate, in order to increase the operation speed, it is only natural that a pair of functional blocks which require the most restricted bus operation speed, should be connected to a divisional bus having the smallest load capacity. Note that the above description was made in consideration of that the data transfer which crosses the bus switch circuit generally requires a more time that the case where the transfer does not cross the circuit. More simply stating, it is possible that if a pair of functional blocks which require a shorter data transfer time, are connected to the same divisional bus, a similar effect can be obtained.

Figure 2A:
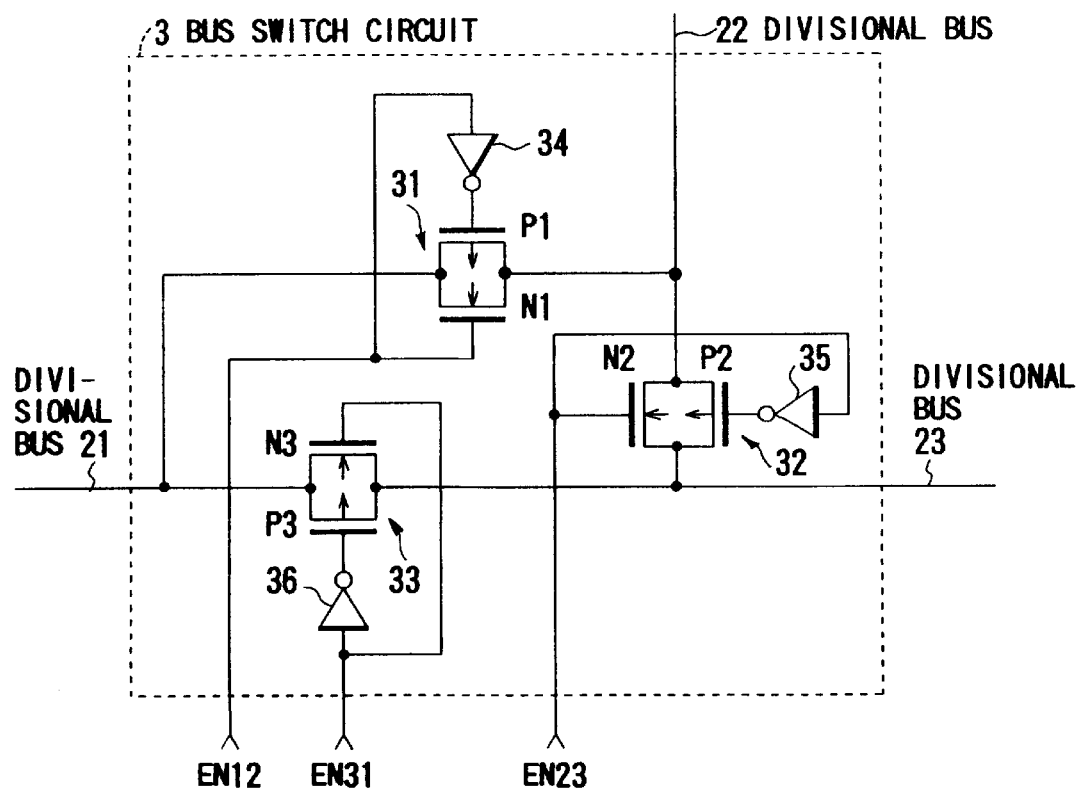
FIG. 2A is a circuit diagram illustrating a specific example of a 1-bit section of the bus switch circuit shown in FIG. 1.

FIG. 2A shows a specific example of a 1-bit portion of the bus switch circuit 3 shown in FIG. 1. As can be seen in FIG. 2A, a first CMOS switch circuit 31 is connected between a first divisional bus 21 and a second divisional bus 22, a second CMOS switch circuit 32 is connected between the second divisional bus 22 and a third divisional bus 23, and a third CMOS switch circuit 33 is connected between the third divisional bus 23 and the first divisional bus 21.

In the first CMOS switch circuit 31, a transmission gate made of a first PMOS transistor P1 and a first NMOS transistor N1, is used, in the second CMOS switch circuit 32, a transmission gate made of a second PMOS transistor P2 and a second NMOS transistor N2, is used, and in the third CMOS switch circuit 33, a transmission gate made of a third PMOS transistor P3 and a third NMOS transistor N3, is used.

A first control signal EN12 used for controlling the connection of the first divisional bus 21 and the second divisional bus 22, is supplied to the gate of the first NMOS transistor N1, and at the same time, after being inverted by a first inverter circuit 34, is supplied to the gate of the first PMOS transistor P1.

A second control signal EN23 used for controlling the connection of the second divisional bus 22 and the third divisional bus 23, is supplied to the gate of the second NMOS transistor N2, and at the same time, after being inverted by a second inverter circuit 35, is supplied to the gate of the second PMOS transistor P2.

A third control signal EN31 used for controlling the connection of the third divisional bus 23 and the third divisional bus 21, is supplied to the gate of the third NMOS transistor N3, and at the same time, after being inverted by a third inverter circuit 36, is supplied to the gate of the third PMOS transistor P3.

Each of the above control signals EN12 to EN31 is set in an active state (level "H" in this embodiment) when corresponding two divisional buses are to be connected, and otherwise set in an inactive state (level "L" in this embodiment).

It should be noted that each of the CMOS switch circuits 31 to 33 is not limited to a transmission gate as described above, but can be remodeled into some other structure.

It should be also noted that, as depicted in FIG. 2B, the switch circuit is not necessary between a pair of divisional busses functional blocks connected to one (22) of which have no access between those connected to another (23).

FIG. 3 shows a low power consumption data transfer bus of an LSI, according to the second embodiment of the first aspect of the present invention.

The low power consumption data transfer bus shown in FIG. 3 is similar to the data transfer bus shown in FIG. 1 except for the following points. That is, a part of the divisional buses (denoted by reference numeral 23 in this embodiment) is connected so that the part is further divided into three or more divisional buses 232 to 233 by a second bus switch circuit 3a, and functional blocks 17 to 20 are connected to the newly divided buses. Further, a second decoder circuit 4a which corresponds to the second bus switch circuit 3a is provided, and the bus switch circuits 3 and 3a are arranged away from each other on the chip of the LSI. Structural elements shown in FIG. 3, which are similar to those in FIG. 3 are designated by the same reference numerals.

According to the second embodiment, basically a similar effect to that of the first embodiment can be obtained; however the power consumption increases by the degree corresponding to an increase in the number of elements used. In the case where the pattern area is enlarged if the bus switch circuit is arranged at one place as in the first embodiment, due to the layout on the LSI chip, the increase in the pattern area and the increase in the power consumption trade off with each other. In the case, the second embodiment is recommended to be employed.

FIG. 4 shows a low power consumption data transfer bus on an LSI-mounted board, according to an embodiment of the second aspect of the present invention.

The low power consumption data transfer bus shown in FIG. 4 includes a bus switch circuit 43 connected so that one data transfer bus provided between a plurality of LSIs 41 to 46 mounted on a printed wiring board (substrate) 40 is divided into three or more divisional buses. The data transfer bus further includes a decoder circuit 44 for decoding an order signal which requires two of the divisional buses in the operation of the data transfer bus, and for controlling the bus switch circuit so that only the two of the divisional buses are connected to each other in reply to the decode output.

With the embodiment of the second aspect of the invention, a similar effect to that of the first embodiment of the first aspect of the invention can be obtained by a similar operation.

As described above, with the low power consumption data transfer bus according to the present invention, the mode of division of a bus is associated with a specific layout on an actual LSI chip or an actual LSI-mounted board, and access frequency between functional blocks connected to the bus and therefore the effect of the bus division can be obtained to the maximum degree for the object of achievement of the low power consumption. Further the operation speed of the bus (that is, data transfer speed) can be improved as compared to the case where the bus is not divided.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A low power consumption data transfer bus comprising:
   an LSI;
   a plurality of functional blocks within said LSI;
   a data transfer bus provided between said plurality of functional blocks;
   three or more divisional buses obtained by dividing said data transfer bus;
   a bus switch circuit for connecting said plurality of divisional buses to each other; and
   a decoder circuit for decoding an order signal which requires two of said plurality of divisional buses during an operation of said data transfer bus, and controlling said bus switch circuit so that only said two divisional buses are connected to each other in reply to a decode output,
   wherein said bus switch circuit is positioned in a predetermined section on a chip of said LSI and loads on said divisional buses are asymmetrical.

2. A low power consumption data transfer bus according to claim 1, wherein, of said plurality of functional blocks, a pair of functional blocks having a highest average access frequency with respect to the data transfer bus are connected to a divisional bus having a lightest load of said plurality of divisional buses.

3. A low power consumption data transfer bus according to claim 1, wherein said plurality of functional blocks are registered in the order of a data transfer time which is allowed to be shorter;
   a maximum load which satisfies a predetermined data transfer time is obtained in both a case where data crosses the bus switch circuit, and a case where data does not cross the bus switch circuit;
   a procedure that a pair of functional blocks having a highest average access frequency with respect to the data transfer bus, of said plurality of functional blocks, are connected to a divisional bus having a lightest load of said plurality of divisional buses, is executed; and
   each time a functional block conforming to a condition of said data transfer time appears, said functional block is connected to a predetermined divisional bus prior to a functional block determined due to a power-saving requirement.

4. A low power consumption data transfer bus according to claim 1, wherein, of said plurality of functional blocks, a pair of functional blocks which require a shortest data transfer time are connected to a divisional bus having a lightest load of said plurality of divisional buses.

5. A low power consumption data transfer bus comprising:
   an LSI;
   a plurality of functional blocks within said LSI;
   a data transfer bus provided between said plurality of functional blocks;
   three or more divisional buses obtained by dividing said data transfer bus;
   a bus switch circuit for connecting said plurality of divisional buses to each other;
   a decoder circuit for decoding an order signal which requires two of said plurality of divisional buses during an operation of said data transfer bus, and controlling said bus switch circuit so that only said two divisional buses are connected to each other in reply to a decode output; and
   a second bus switch circuit connected so that a part of said divisional buses is further divided into three or more divisional buses,
   wherein said bus switch circuit and said second bus switch circuit are arranged to be away from each other in the chip of said LSI.

6. A low power consumption data transfer bus comprising:
   a printed circuit board;
   a plurality of LSIs mounted on said printed circuit board;
   a data transfer bus provided between said plurality of LSIs;
   a plurality of divisional buses obtained by dividing said data transfer bus;
   a bus switch circuit for connecting said plurality of divisional buses to each other; and
   a decoder circuit for decoding an order signal which requires two of said plurality of divisional buses during an operation of said data transfer bus, and controlling said bus switch circuit so that only said two divisional buses are connected to each other in reply to a decode output,
   wherein said bus switch circuit is positioned in a predetermined section on said printed circuit board and loads on said divisional buses are asymmetrical.

7. A low power consumption data transfer bus according to claim 6, wherein, of said plurality of LSIs, a pair of LSIs having a highest average access frequency with respect to the data transfer bus are connected to a divisional bus having a lightest load of said plurality of divisional buses.

8. A low power consumption data transfer bus according to claim 6, wherein said plurality of LSIs are registered in the order of a data transfer time which is allowed to be shorter;

- a maximum load which satisfies a predetermined data transfer time is obtained in both a case where data crosses the bus switch circuit, and a case where data does not cross the bus switch circuit;
- a procedure that a pair of LSIs having a highest average access frequency with respect to the data transfer bus, of said plurality of LSIs, are connected to a divisional bus having a lightest load of said plurality of divisional buses, is executed; and
- each time an LSI conforming to a condition of said data transfer time appears, said LSI is connected to a predetermined divisional bus prior to an LSI determined due to a power-saving requirement.

9. A low power consumption data transfer bus according to claim 6, wherein, of said plurality of LSIs, a pair of LSIs which require a shortest data transfer time are connected to a divisional bus having a lightest load of said plurality of divisional buses.

10. A low power consumption data transfer bus comprising:

- a printed circuit board;
- a plurality of LSIs mounted on said printed circuit board;
- a data transfer bus provided between said plurality of LSIs;
- a plurality of divisional buses obtained by dividing said data transfer bus;
- a bus switch circuit for connecting said plurality of divisional buses to each other;
- a decoder circuit for decoding an order signal which requires two of said plurality of divisional buses during an operation of said data transfer bus, and controlling said bus switch circuit so that only said two divisional buses are connected to each other in reply to a decode output; and
- a second bus switch circuit connected so that a part of said divisional buses is further divided into three or more divisional buses,
- wherein said bus switch circuit and said second bus switch circuit are arranged to be away from each other in the printed circuit board.

* * * * *